(12) United States Patent
Viadya et al.

(10) Patent No.: US 7,722,695 B2
(45) Date of Patent: May 25, 2010

(54) NEEM BASED COMPOSITION FOR COATING NITROGENOUS FERTILIZER

(75) Inventors: Chandrashekhar Kashinath Viadya, Mumbai (IN); Brahmanand Amba Shankhar Vyas, Mumbai (IN); Ramaswamy Iyer, Mumbai (IN); Keki Bamanshaw Mistry, Mumbai (IN); Nadir Burjor Godrej, Mumbai (IN)

(73) Assignee: Godrej Agrovet Limited, Mumbai (IN)

( * ) Notice: Subject to any disclaimer, the term of this patent is extended or adjusted under 35 U.S.C. 154(b) by 530 days.

(21) Appl. No.: 11/691,814

(22) Filed: Mar. 27, 2007

(65) Prior Publication Data

US 2007/0227213 A1 Oct. 4, 2007
US 2008/0307846 A2 Dec. 18, 2008
US 2009/0113967 A2 May 7, 2009

(30) Foreign Application Priority Data

Mar. 27, 2006 (IN) .................. 442/MUM/2006

(51) Int. Cl.
*C05C 9/00* (2006.01)
*C05C 11/00* (2006.01)
*C09K 3/00* (2006.01)

(52) U.S. Cl. .................. 71/28; 71/54; 71/58; 71/64.07; 106/14.41; 106/14.42

(58) Field of Classification Search ............... 71/11–26, 71/28, 54, 58, 64.07; 106/14.41, 14.42
See application file for complete search history.

(56) References Cited

FOREIGN PATENT DOCUMENTS

IN 185675 3/2001
IN 193152 7/2004

OTHER PUBLICATIONS

N. V. Krishnaiah et al, "Recent approaches in root-zone placement of insecticides for effective rice pest control", International Journal of Pest Management, 1366-5863, vol. 34, Issue 1, 1988, pp. 68-71 (no month).*
P. R. Ramesh, "Reducing the Volatile Losses of Urea by Treatment with Neem Oil and Proper Method of Application in Acid Sandy Loams", Mysore Journal of Agricultural Sciences, vol. 40 (1) (2006), pp. 131-133 (no month).*
I. K. Suri et al, "Coating of Prilled Urea with Neem", Fertiliser News, Dec. 2000, vol. 45 (12), pp. 71-72.*
Devakumar et al., "Chemistry" Neem Research and Development, Eds. N.S.Randhawa and B.S. Parmar, Publication No. 3 (1993), Society of Pesticide Science, India. pp. 63-96.
Moss et al., "Nitrification Retarders and Slow-Release Nitrogen Fertilizers" Advances in Agronomy (1971). pp. 337-383.
Prasad et al., "Significance In Increasing Fertilizer Nitrogen Efficiency" (1996) pp. 121-132.
Suri et al., "Coating of Prilled Urea with Neem: Trial at KRIBHCO's Hazira Plant" Fertiliser News. (2000) vol. 45(12), pp. 71-72.
"Guidelines for drinking-water quality, third edition, incorporating first addendum" Water Sanitation and Health (WSH), World Health Organization (WHO); 5 pages. http://www.who.int/water_sanitation_health/dwq/gdwq3rev/en/index.html.

* cited by examiner

*Primary Examiner*—Wayne Langel
(74) *Attorney, Agent, or Firm*—Hamre, Schumann, Mueller & Larson

(57) ABSTRACT

A neem based composition for coating nitrogenous fertilizer. The composition comprises 2-10 percent by weight neem extract, 10-60 percent by weight neem oil, 10-25 percent by weight binder and 25-50 percent by weight organic solvent. Also a method of making the composition by mixing the ingredients, a method of coating a nitrogenous fertilizer by mixing it with 0.5 to 1.0 percent by weight of the neem based composition and nitrogenous fertilizer coated with 0.5 to 1.0 percent by weight of the neem based composition.

15 Claims, No Drawings

NEEM BASED COMPOSITION FOR COATING NITROGENOUS FERTILIZER

FIELD OF INVENTION

This invention relates to a neem based composition for coating nitrogenous fertilizer.

This invention also relates to a method of making the neem based composition, method of coating nitrogenous fertilizer with the composition and nitrogenous fertilizer coated with the composition.

PRIOR ART

Urea is the major nitrogenous fertilizer being used on crops worldover. Immediately on application to soil, urea undergoes chemical/biochemical transformations through hydrolysis and nitrification. Hydrolysis takes place in the presence of water and enzyme called urease and results in the breakdown of amide form of nitrogen into ammoniacal nitrogen or ammonium carbonate. The resultant ammoniacal nitrogen undergoes further transformation ie nitrification in the presence of oxygen and soil bacteria (*Nitrosomonas* sps. and *Nitrobacter* sps.) to give nitrite and nitrate forms of nitrogen. Hydrolysis and nitrification of urea fertilizer are to a large extent completed in 15-20 days under most atmospheric conditions, whereas most cultivated crops generally take more than 90-100 days to complete their lifecycle. Nitrates are highly water soluble and when formed in large quantities in excess of the limited quantities required by the crops at early stages of their growth due to rapid hydrolysis and nitrification of urea, they are liable to be leached down the soil profile beyond the active root zone of crops. This reduces use efficiency of urea fertilizer by crops. Moreover, under water logged conditions, nitrates are reduced to nitrous oxide and elemental nitrogen by the action of soil bacteria to meet their oxygen demand. This leads to development of nitrogen deficiency and poor crop yields.

Besides the economic losses on account of poor crop yields, losses of fertilizer nitrogen mainly in the form of leaching of nitrates and emission of nitrous oxide, being a green house gas, pose serious environmental hazards. World Health Organisation of United Nations has in fact prescribed a maximum limit of 50 mg/litre for nitrates in drinking water. This is mainly because higher nitrate content in drinking water eventually may lead to blood cancer (Methaemoglobinae mia) in new born babies. Nitrous oxide on the other hand has a very significant 310 times more global warming potential via-a-vis the other green house gas carbon dioxide. Therefore, any development leading to reduction in leaching and denitrification of fertilizer nitrogen would not only enhance crop use efficiency and productivity but also ensure environmental safety.

Constituents of neem and other non-edible oilseeds such as karanj, mahua or castor are reported to be effective nitrogen inhibitors (Devkumar and Sukhdev, 1993, In. Neem Research and Development, Society of Pesticide Science, New Delhi 63-96; Prasad and others, 1971, Advance in Agronomy, 23, 357-383; Prasad and others, 1996, In, Neem Research and Development, New Age International Publishers, New Delhi, 121-132). Coating of urea with neem cake or neem oil alone or in combination with neem fatty acid distillation residue is reported (Indian Patents Nos 185675 and 193152 and 1 K Suri and other 2000, Fertiliser New 71-72)

OBJECTS OF INVENTION

An object of the invention is to provide a neem based composition for coating nitrogenous fertilizer, which composition reduces denitrification and leaching losses of the nitrogenous fertilizer.

Another object of the invention is to provide a neem based composition for coating nitrogenous fertilizer, which composition increases the efficiency of use of the fertilizer by the crops and the yield of crops.

Another object of the invention is to provide a method of making a neem based composition for coating nitrogenous fertilizer, which composition reduces denitrification and leaching losses of the nitrogenous fertilizer.

Another object of the invention is to provide a method of making neem based composition for coating nitrogenous fertilizer, which composition increases the efficiency use of the fertilizer by the crops and the yield of crops.

Another object of the invention is to provide a method of coating a nitrogenous fertilizer with a neem based composition which reduces denitrification and leaching losses of the nitrogenous fertilizer.

Another object of the invention is to provide a method of coating a nitrogenous fertilizer with a neem based composition which increases the efficiency of use of the fertilizer by the crops and the yield of crops.

Another object of the invention is to provide a nitrogenous fertilizer coated with a neem based composition which reduces denitrification and leaching losses of the nitrogenous fertilizer.

Another object of the invention is to provide a nitrogenous fertilizer coated with a neem based composition which increases the efficiency of use of the fertilizer by the crops and the yield of crops.

Another object of the invention is to provide urea or urea prills coated with a neem based composition which reduces denitrification and leaching losses of urea.

Another object of the invention is to provide urea or urea prills coated with a neem based composition which increases the efficiency of use of the fertilizer by the crops and the yield of crops.

DETAILED DESCRIPTION OF INVENTION

According to the invention there is provided a neem based composition for coating nitrogenous fertiliser, the composition comprising 2-10 percent by weight neem extract, 10-60 percent by weight neem oil, 10-25 percent by weight binder and 25-50 percent by weight organic solvent.

According to the invention there is also provided a method making a neem based composition for coating nitrogenous fertilizer, the method comprising mixing 2-10 percent by weight neem extract, 10-60 percent by weight neem oil, 10-25 percent by weight binder and 25-50 percent by weight organic solvent.

Preferably, the composition comprises 5 percent by weight neem extract, 40 percent by weight neem oil, 15 percent by weight binder and 40 percent by weight organic solvent.

Preferably, the neem extract in the composition contains 5 to 10 percent by weight triterpenes. Preferably the triterpenes in the neem extracts comprise salanin and deacetyl salanin.

The binder is selected from synthetic polymers, gum Arabica or rosin and is preferably rosin. The organic solvent is selected from Xylene, Aromax, C-IX or deodorized kerosene and is preferably deodorized kerosene.

Preferably, the composition has a density of 0.93-0.96 g/cc, organic carbon content of 70% w/w, minimum, total nitrogen content of 0.45-0.55%, w/w, moisture content of 2.0% w/w maximum by Karl Fischer and methanol solubles content of 20.0% w/w, minimum.

According to the invention there is also provided a method of coating a nitrogenous fertilizer, which comprises mixing the nitrogenous fertilizer with 0.5 to 1.0 percent by weight of the neem based composition described above.

According to the invention there is also provided a nitrogenous fertilizer coated with 0.5 to 1.0 percent by weight of the neem based composition described above.

Preferably the nitrogenous fertilizer comprises urea or urea prills coated with 0.5 to 1.0 percent by weight of the neem based composition described above.

Studies were carried out using typical neem based compositions of the invention comprising 5% by weight neem extract, 40% by weight neem oil, 15% by weight rosin pitch and 40% by weight deodorized kerosene and having density of 0.93-0.96 g/cc, organic carbon content of 70% w/w, total nitrogen content of 0.45-0.55% w/w, moisture content of 2.0% w/w by Karl Fischer and methanol solubles content of 20.0% w/w. The compositions were formed by mixing the ingredients together with varying percentages of triterpenes as stated below. Urea was coated with the compositions by mixing it with the compositions. The study details were as follows:

The influence of the coating of urea with the composition of the invention on emission of nitrous oxide (denitrification) in two soils under laboratory conditions up to 35 days was studied and the results were as shown in the following Table 1.

TABLE 1

| Treatments | Total $N_2O$ (mg/kg soil) | |
| --- | --- | --- |
| | Alkaline/soil (pH 7.8) | Acidic Soil (pH 5.6) |
| Uncoated Urea | 25539.9 | 28.4 |
| $N_1C_1$-Coated Urea | 23613.2 | 28.1 |
| $N_1C_2$-Coated Urea | 21517.8 | 23.2 |
| $N_1C_3$-Coated Urea | 20446.8 | 22.8 |
| $N_2C_1$-Coated Urea | 18615.4 | 19.3 |
| $N_2C_2$-Coated Urea | 13940.3 | 16.8 |
| $N_2C_3$-Coated Urea | 11961.6 | 16.0 |
| $N_3C_1$-Coated Urea | 18111.2 | 18.7 |
| $N_3C_2$-Coated Urea | 13913.2 | 17.3 |
| $N_3C_3$-Coated Urea | 10989.4 | 16.6 |
| C. D. (p = 0.05) | 1473.2 | 1.8 |

$N_1$ = Composition comprising neem extract containing 2% triterpenes
$N_2$ = Composition comprising neem extract containing 5% triterpenes
$N_3$ = Composition comprising neem extract containing 10% triterpenes
$C_1$ = Coating thickness of 0.3% w/w of urea
$C_2$ = Coating thickness of 0.5% w/w of urea
$C_3$ = Coating thickness of 1.0% w/w of urea The influence of the coating of urea with the composition of the invention on emission of nitrous oxide as well as accumulation of nitrate through leaching in rice soil under field conditions (duration 75 days) were studied and the results were as shown in the following Table 2.

TABLE 2

| Treatments | Leaching Losses $NO_3 + NO_2$ Kg/ha | Dentrication Loss $N_2O$ N Kg/ha |
| --- | --- | --- |
| Uncoated Urea | 30.4 | 7.8 |
| $N_1C_1$-Coated Urea | 28.6 | 6.4 |
| $N_1C_2$-Coated Urea | 27.3 | 5.3 |
| $N_1C_3$-Coated Urea | 27.0 | 5.2 |
| $N_2C_1$-Coated Urea | 25.3 | 5.0 |
| $N_2C_2$-Coated Urea | 20.4 | 4.6 |
| $N_2C_3$-Coated Urea | 19.3 | 4.4 |
| $N_3C_1$-Coated Urea | 23.4 | 5.0 |
| $N_3C_2$-Coated Urea | 19.6 | 4.5 |
| $N_3C_3$-Coated Urea | 19.2 | 4.5 |
| C. D. (p = 0.05) | 4.3 | 0.7 |

The influence of the coating of urea with the composition of the invention on reduction in leaching losses and volatilization losses under field conditions (wheat-sampling duration: 70 days) was studied and the results were as shown in the following Table 3.

TABLE 3

| Treatments | Leaching Losses $NO_3 + NO_2$—N Kg/ha | Volatilisation $NH_4$—N Kg/ha |
| --- | --- | --- |
| Uncoated Urea | 15.7 | 21.3 |
| $N_1C_1$-Coated Urea | 14.3 | 21.4 |
| $N_1C_2$-Coated Urea | 14.1 | 20.6 |
| $N_1C_3$-Coated Urea | 13.7 | 19.8 |
| $N_2C_1$-Coated Urea | 11.6 | 19.5 |
| $N_2C_2$-Coated Urea | 9.6 | 18.6 |
| $N_2C_3$-Coated Urea | 9.0 | 18.2 |
| $N_3C_1$-Coated Urea | 11.4 | 19.6 |
| $N_3C_2$-Coated Urea | 9.1 | 19.2 |
| $N_3C_3$-Coated Urea | 9.0 | 18.8 |
| C. D. (p = 0.05) | 1.8 | 1.9 |

The influence of the coating of urea with the composition of the invention was studied in field conditions on grain yield of wheat and rice and the results were as shown in the following Table 4.

TABLE 4

| Treatments | Wheat Tons/ha | Rice Tons/ha |
| --- | --- | --- |
| Uncoated Urea | 3.03 | 4.73 |
| $N_1C_1$-Coated Urea | 3.89 | 5.04 |
| $N_1C_2$-Coated Urea | 4.11 | 5.91 |
| $N_1C_3$-Coated Urea | 4.26 | 6.23 |
| $N_2C_1$-Coated Urea | 4.18 | 6.47 |
| $N_2C_2$-Coated Urea | 5.63 | 7.21 |
| $N_2C_3$-Coated Urea | 5.81 | 7.20 |
| $N_3C_1$-Coated Urea | 4.81 | 6.95 |
| $N_3C_2$-Coated Urea | 5.61 | 7.40 |
| $N_3C_3$-Coated Urea | 5.93 | 7.26 |
| C. D. (p = 0.05) | 0.42 | 0.52 |

As can be seen in the Tables 1 to 4, the neem oil based composition of the invention reduces denitrification and leaching loses of nitrogenous fertilizer particularly urea and increases efficiency of use of urea by the crops and yield of crops. As emission of nitrous oxide is reduced, green house effect and resultant environmental problem is reduced. According to the invention, the constituents of the composition of the invention are selected and used in the optimum proportions with appropriate percentage of triterpenes so as to obtain a composition having improved activity. The neem extract provides the requisite amount of triterpenes; the neem oil acts as a spreading agent; and desired viscosity is imparted to the composition by the rosin pitch and deodorized kerosene.

We claim:

1. A neem based composition for coating nitrogenous fertilizer, the composition comprising:
   2-10 percent by weight neem extract,
   10-60 percent by weight neem oil,
   10-25 percent by weight binders and
   25-50 percent by weight organic solvents
   wherein the neem extract contains 5 to 10 percent by weight triterpenes, and
   the composition has
      a density of 0.93-0.96 g/cc,
      an organic carbon content of at least 70% w/w,
      a total nitrogen content of 0.45-0.55% w/w,
      a moisture content of 2.0% w/w or less as measured by Karl Fischer, and
      a methanol solubles content of at least 20.0% w/w.

2. A composition as claimed in claim 1, which comprises 5 percent by weight neem extract, 40 percent by weight neem oil, 15 percent by weight binder and 40 percent by weight organic solvent.

3. A composition as claimed in claim 1, wherein the triterpenes comprise salanin and deacetyl salanin.

4. A composition as claimed in claim 1, wherein the binder is rosin and the organic solvent is deodorised kerosene.

5. A method of making a neem based composition for coating nitrogenous fertilizer, the method comprising:
   mixing 2-10 percent by weight neem extract, 10-60 percent by weight neem oil, 10-25 percent by weight binder and 25-50 percent by weight organic solvent,
   wherein the neem extract contains 5 to 10 percent by weight triterpenes, and the composition has
      a density of 0.93-0.96 g/cc,
      an organic carbon content of at least 70% w/w,
      a total nitrogen content of 0.45-0.55% w/w,
      a moisture content of 2.0% w/w or less as measured by Karl Fischer, and
      a methanol solubles content of at least 20.0% w/w.

6. A method as claim in claim 5, wherein the composition comprises 5 percent by weight neem extract, 40 percent by weight neem oil, 15 percent by weight binder and 40 percent by weight organic solvent.

7. A method as claimed in claim 5, wherein the triterpenes comprise salanin and deacetyl salanin.

8. A method as claimed in claim 5, wherein the composition comprises rosin as binder and deodorised kerosene as organic solvent.

9. A method of coating a nitrogenous fertilizer which comprises mixing the nitrogenous fertilizer with 0.5 to 1.0 percent by weight of the neem based composition as claimed in claim 1.

10. Nitrogenous fertilizer coated with 0.5 to 1.0 percent by weight of the neem based composition as claimed in claim 1 by the method as claimed in claim 9.

11. Nitrogenous fertilizer as claimed in claim 10 comprising urea or urea prills coated with 0.5 to 1.0 percent by weight of the neem based composition as claimed in claim 1 by the method as claimed in claim 9.

12. A nitrogenous fertilizer, comprising:
   urea; and
   a neem based composition that coats the urea,
   wherein the neem based composition includes
      2-10 percent by weight neem extract based on the total weight of the neem based composition,
      10-60 percent by weight neem oil based on the total weight of the neem based composition,
      10-25 percent by weight binder based on the total weight of the neem based composition, and
      25-50 percent by weight organic solvent based on the total weight of the neem based composition,
   the neem extract contains 5 to 10 percent by weight triterpenes based on the total weight of the neem based composition,
   the neem based composition has
      a density of 0.93-0.96 g/cc,
      an organic content of at least 70% by weight based on the total weight of the neem based composition,
      a total nitrogen content of 0.45-0.55% by weight based on the total weight of the neem based composition,
      a moisture content of 2.0% by weight or less based on the total weight of the neem based composition as measured by Karl Fischer, and
      a methanol solubles content of at least 20.0% by weight based on the total weight of the neem based composition, and
   the neem based composition is included in an amount of 0.5 to 1.0% by weight based on the total weight of the urea and the neem based composition.

13. A nitrogenous fertilizer as claimed in claim 12, wherein the nitrogenous fertilizer comprises 5 percent by weight of the neem extract based on the total weight of the neem based layer, 40 percent by weight of the neem oil based on the total weight of the neem based layer, 15 percent by weight of the binder based on the total weight of the neem based layer and 40 percent by weight of the organic solvent based on the total weight of the neem based layer.

14. A nitrogenous fertilizer as claimed in claim 12, wherein the triterpenes include salanin and deacetyl salanin.

15. A nitrogenous fertilizer as claimed in claim 12, wherein the composition comprises rosin as the binder and deodorized kerosene as the organic solvent.

* * * * *